United States Patent [19]

Ono et al.

[11] 4,049,831

[45] Sept. 20, 1977

[54] NOVEL COMPOSITION CONTAINING FATS OR OILS AND METHOD FOR MANUFACTURING SAME

[75] Inventors: Fumio Ono; Yasuo Aoyama, both of Kashiwa, Japan

[73] Assignee: Kikkoman Shoyu Co., Ltd., Noda, Japan

[21] Appl. No.: 517,247

[22] Filed: Oct. 23, 1974

[30] Foreign Application Priority Data

Oct. 31, 1973 Japan .................................. 48-121619
Feb. 13, 1974 Japan .................................. 49-16820

[51] Int. Cl.$^2$ .......................... A23D 5/00; A23L 1/04; A23L 1/313
[52] U.S. Cl. ........................................ 426/72; 426/74; 426/574; 426/576; 426/602; 426/613; 426/654; 426/655; 426/657; 426/437
[58] Field of Search ............... 426/194, 212, 362, 364, 426/369, 437, 574, 576, 613, 654, 655, 657, 650, 652, 589, 72, 74; 252/354, 356, 363.5

[56] References Cited

U.S. PATENT DOCUMENTS

| | | | |
|---|---|---|---|
| 1,007,142 | 10/1911 | Rademacher | 426/589 |
| 1,193,739 | 8/1916 | Till | 426/589 |
| 2,057,479 | 10/1936 | Darling | 426/369 X |
| 2,953,456 | 9/1960 | Mohler et al. | 426/655 X |
| 3,047,399 | 7/1962 | Landmann et al. | 426/655 X |
| 3,348,954 | 10/1967 | Green | 426/589 X |
| 3,833,743 | 9/1974 | Morse et al. | 426/194 X |

OTHER PUBLICATIONS

Berolzheimer, R., "Culinary Arts Inst. Encyclopedic Cookbook" Culinary Arts Inst. Chicago 1948, pp. 99–100.
Given, M., "Modern Encyclopedia of Cooking," vol. 2, J. G. Ferguson and Associates, Chicago, 1949, pp. 997–1000.

*Primary Examiner*—Raymond N. Jones
*Assistant Examiner*—R. A. Yoncoskie

[57] ABSTRACT

A composition containing a fat or oil is obtained by adding with stirring a fat or oil to an aqueous solution containing 0.8% by weight or more in terms of soluble nitrogen content of an aqueous extract from an animal source, which extract contains as main constituent water-soluble and thermally noncoagulable polypeptides, and having a viscosity at 25° C. of 30 centipoises or higher, thus solubilizing said fat or oil without using any artificial emulsifier or surface active agent. The composition is stable and does not separate the fat or oil over a long period of time. A fatty food product of high nutritive value is obtained by use of an edible oil, seasonings, and other additives.

17 Claims, No Drawings

NOVEL COMPOSITION CONTAINING FATS OR OILS AND METHOD FOR MANUFACTURING SAME

This invention relates to a novel composition containing a fat or oil and to the method for preparing same. More particularly, this invention relates to a fat- or oil-containing composition in which a fat or oil has been solubilized in the aqueous solution by the addition of an aqueous extract obtained from an animal source and having fat- or oil-solubilizing ability and to the method for preparing such a composition.

Conventionally known methods for producing a stably dispersed mixture of fat or oil and water are those of emulsification and solubilization. The known emulsification method utilizes an emulsifier or a surface active agent to form an oil-in-water or water-in-oil type emulsion. Typical examples of such emulsion products are mayonnaise and butter among food products and cleansing cream and emollient cream among cosmetic products. These products consist of a continuous phase of water or fat or oil and an oil or aqueous phase suspended therein in the form of spherical droplets, about 1 $\mu$ in diameter. In such an emulsion system, when the two phases become greatly different in specific gravity by addition of, for example, a relatively large amount of seasoning to obtain fat- or oil-containing food products, the specific gravity of the aqueous phase being increased, there results marked loss in emulsion stability. This is the chief reason for limited diversification of the fat- or oil-containing food products.

On the other hand, as stated above, the solubilization technique has recently been developed as a method other than that of emulsification for dispersing insoluble substances and is now partially in the stage of practical use in detergent and cosmetic industries. The mechanism of solubilization is such that a surface active agent, in a solution of a concentration thereof higher than a certain limit, forms a micelle which adsorbs an insoluble substance on its polar surface or said substance diffuses into inner part of the micelle and becomes stabilized. This phenomenon is called solubilization, because the dispersion thus obtained containing the insoluble substance becomes clear as if the insoluble substance has apparently dissolved into the solution. It is considered essential for solubilization that the surface active agent is present in a concentration as high as, for example, 20 to 40% in the case of a hair dressing preparation. Such a high concentration of a surface active agent is not allowed in the case of food products for which the basic requirement is safety for the human health.

Under the circumstances, the present inventors conducted extensive investigations to develop a method for producing a stable dispersion of fats and oils in manufacturing fat- or oil-containing food products and so as to expand the field of these food products and as a result found that an aqueous extract containing as the main constituent thermally noncoagulable water-soluble peptides obtained by extracting animal products such as meats with hot water manifests a very strong fat- or oil-solubilizing ability under specific conditions, forming a stable dispersion of fats and oils without addition of any artificial emulsifier or surface active agent. In other words, it was found that the said extract acts as a natural solubilizer and the stability of the fat or oil dispersion is not affected even when the aqueous solution containing said extract is admixed with high concentrations of other additives such as seasonings, thus making it easy to manufacture a composition containing fats or oils and, in addition, high concentrations of seasonings. Based on these findings, this invention has been accomplished.

According to the method of this invention, there may be obtained a novel composition, in which a fat or oil is highly solubilized and will not separate out, by adding with stirring the fat or oil to an aqueous solution containing 0.8% by weight or more in terms of soluble nitrogen content of an aqueous extract from an animal source, which extract contains as main constituent water-soluble and thermally noncoagulable polypeptides, said aqueous solution having a viscosity at 25° C. of 30 centipoises or higher. When the composition is a food product, other additives such as seasonings may be added, if required, in addition to the said extract.

Further, a fat- or oil-containing jelly-like composition may be obtained by admixing the above-said aqueous solution with gelatin to a concentration of 2 to 10% by weight, adding to 1 part by weight (excluding gelatin) of the resulting solution 4 parts by weight or less of a fat or oil, and cooling the resulting mixture.

An object of this invention is to provide a novel fat- or oil-containing composition in which the fat or oil has been solubilized in stable state without using any artificial surface active agent or emulsifier.

Another object of this invention is to provide a novel fat- or oil-containing food product with high nutritive value.

A further object of this invention is to provide a method for manufacturing the above-said novel fat- or oil-containing compositions or fat- or oil-containing food products.

Other objects and advantages of this invention will become apparent from the following description.

In the first place, in the method for manufacturing a fat- or oil-containing food product of this invention, the essential material is an aqueous extract of animal raw materials, said extract containing as the main constituent water-soluble and thermally noncoagulative peptides. The animal sources from which the extract is to be obtained have no particular restriction and include livestocks, fowls, and whales, such as, for example, pig, cattle, horse, whale, sheep, rabbit, fowls (for example, chicken, turkey, and goose); sea foods such as fishes, shellfishes, and crustaceans (for example, crawfishes). In case the composition is intended for the food use, the animal raw materials should, of course, be edible.

The "aqueous extract of animal raw materials containing as the main constituent water-soluble and thermally noncoagulable peptides" (hereinafter referred to as animal extract) for use in this invention is obtained from animal raw materials such as meats by extracting with water, hot or warm, in an ordinary way to remove insoluble matters, when required, said animal raw materials having been subjected to suitable ordinary pre-treatments such as dehairing, skinning, hulling, and removal of entrails and bones, and, if necessary, grinding, and, if necessary, after having been deodorized and decolorized, concentrating the aqueous extract or drying to a powder. If the heat coagulable matters are not removable as a part of insoluble matters, the aqueous extract is further heat-treated (for example, boiling for one hour) to remove said heat-coagulative matters, because said heat-coagulative matters do not act as a solubilizing agent for fats and oils.

In preparing the aqueous extract, the most suitable procedure is extraction with hot water (for example, extraction with water at a temperature of, for example, 90° C. or higher for, for example, 5 to 15 hours), in view of efficiency and removal of heat-coagulative matters together with other water-insoluble matters.

The animal extracts from various sources can be used each alone or in combinations. They contain as the main constituent water-soluble peptides such as, for example, peptone, carnosine, or the like. The water-soluble nitrogen content (hereinafter referred to as WSN) is about 15% by weight and the amino-nitrogen content (AN) is about 1% by weight, both based on the total water-soluble solids originated from the animal raw materials. The water-soluble solids seem to be composed for the most part of proteins, as calculated by use of the protein conversion factor. In Table 1 are shown examples of rough compositions of various animal extracts (concentrated preparations). These animal extracts were obtained by adding 10 parts by weight of water to 1 part by weight of various suitably ground meats, hot-extracting the meats at 90° C. for 10 hours, filtering the extraction mixture to separate an aqueous extract, concentrating the aqueous extract under reduced pressure, and adding to the concentrate common salt as a preservative.

Table 1

| Type of animal extract | Total solids, % by weight | Common salt content, % by weight | WSN % by weight | AN % by weight |
| --- | --- | --- | --- | --- |
| Pork extract | 62.40 | 15.40 | 7.19 | 0.49 |
| Chicken extract | 62.71 | 14.52 | 7.34 | 0.52 |
| Beef extract | 57.60 | 14.60 | 6.96 | 0.31 |
| Fish (mackerel) extract | 81.56 | 20.45 | 9.32 | 1.71 |
| Lobster meat extract | 73.23 | 13.31 | 9.00 | 1.19 |
| Crab meat extract | 67.30 | 12.97 | 4.24 | 1.73 |

Note:
WSN Analytical result by Kjeldahl method.
AN Analytical result by Van Slyke method.

A protein decomposition product obtained by an enzymatic or chemical hydrolysis treatment of meats, i.e. so-called amino acid seasoning, contains a large proportion of amino-nitrogen as high as 50% of the total nitrogen content and is unsuitable for the present purpose because of its poor fat-solubilizing ability, which excludes its use as a solubilizer, and of its adverse effect on flavor of a fat- or oil-containing food product when used in large amounts.

Results of the experiment conducted to examine the relation between the composition of a dispersion system and the solubilization of fat and oil are shown in Experiment Example 1 given below.

EXPERIMENT EXAMPLE 1

In preparing various dispersion systems shown in Table 2, 1 part by weight of a salad oil was added to 1 part by weight of each aqueous solution and mixed with stirring. The stirring and mixing were conducted in such a manner that the salad oil was gradually added to the aqueous solution while being stirred at 100 r.p.m. by means of an universal mixer of Kenwood Chef A-701/A (made by Kenwood Manufacturing Co.) provided with hook-type agitator blades. The state of dispersion, stability, and viscosity of the resulting dispersion systems were summarized in Table 2.

In the dispersion systems No. 2 and No. 4 in Table 2, 17% by weight of the hot-water extract of pork (WSN: 7.19% by weight) shown in Table 1, used as an animal extract, was added to water or the aqueous solution No. 3 (WSN of the aqueous solution: 1.04% by weight).

The viscosity was measured by means of a B-type rotational viscosimeter made by Tokyo Keiki Seisakusho Co. (In Experiment Examples 2 to 6 and in Examples, viscosity was measured in the same manner). The salad oil (viscosity: 57 centipoises at 25° C.) used was a mixture of cotton seed oil and soybean oil in equal amount. The same salad oil was used in other Experiment Examples and in Examples.

Table 2

| | Composition dispersion system | State of dispersion | Stability | Viscosity 25° C. (centipoise) |
| --- | --- | --- | --- | --- |
| No. 1 | Water and oil | Dispersion of spherical droplets | Immediate separation | 145 |
| No. 2 | Aqueous solution (6 centipoises at 25° C) containing animal extract and oil * | Turbid homogeneous dispersion | Immediate separation | 150 |
| No. 3 | Aqueous solution (142 centipoises at 25° C.) containing 50% by weight of dextrin and oil | Dispersion of spherical droplets | Immediate separation | 150 |
| No. 4 | Aqueous solution (243 centipoises at 25° C.) obtained by adding animal extract to the aqueous solution No. 3 and oil (present invention) | Clear viscous homogeneous dispersion | Stable without separation | 4,430 |

Note:
* Although the aqueous solution No. 2 is a dispersion in water containing an aqueous extract of an animal raw material, the dispersion was found failed in achieving the object of this invention because of low viscosity of the aqueous solution.

Regarding the concentration of animal extract used as a solubilizer, it is most important that at least 0.8% by weight in terms of WSN of the extract be present in the aqueous solution in order to achieve the object of this invention. When the concentration is less than 0.8% by weight, the steady solubilized state of fats or oils can no longer be kept for a long period of time and separation of the dispersed fat or oil occurs owing to agglomeration or coalescence.

The upper limit of WSN of the animal extract in the aqueous solution is not set at any particular value, but any concentration can be used so long as the viscosity of the aqueous solution containing the animal extract remains within the range specified later. However, the concentration which is most suitable economically as well as in view of quality of the product is 1 to 2% by weight. If the concentration exceeds 10% by weight, disagreeable odor due to the animal raw material is imparted to the dispersion whatever the purification degree of the animal extract may be and, moreover, the stable solubilization of fats or oils is sometimes affected adversely. Therefore, the upper limit is 10%, preferably 5%, by weight.

In the following Experiment Example 2, are shown the results obtained in an experiment conducted to examine the state of dispersion and viscosity when an oil is dispersed in aqueous solutions containing an animal extract in various WSN.

EXPERIMENT EXAMPLE 2

Various quantities of the pork hot-extract shown in Table 1 were added to an aqueous solution containing 50% by weight of dextrin (DE 30), as shown in Table 3. To 1 part by weight of the resulting solution, was added gradually 2 parts by weight of salad oil with low-speed stirring as shown in Experiment Example 1.

The dispersion state and viscosity of the resulting dispersions were as summarized in Table 3.

The viscosity of the aqueous solution before addition of the salad oil was 142 to 462 centipoises at 25° C.

Table 3

| WSN of aqueous solution, % by weight | State of dispersion | Viscosity, centipoise, 25° C. |
|---|---|---|
| 0 | Non-uniform; tends to separate | 8,500 |
| 0.4 | Non-uniform; tends to separate | 9,300 |
| 0.6 | Non-uniform; tends to separate | 9,500 |
| 0.8 | Uniform; stable | 20,150 |
| 1.0 | Uniform; stable | 26,300 |
| 1.2 | Uniform; stable | 27,600 |
| 1.6 | Uniform; stable | 28,800 |
| 2.0 | Uniform; stable | 35,000 |

Nearly the same results were obtained when animal extracts other than the aqueous extract of pork had been used.

Next, it is also very important to make viscosity of the aqueous solution containing the animal extract sufficiently high to exhibit micelle forming ability. In order to achieve the object of this invention, viscosity of the aqueous solution should be at least 30 centipoises (at 25° C.), preferably 100 to 1,000 centipoises (at 25° C.). When the aqueous phase is an aqueous solution having a low viscosity of below 30 centipoises (at 25° C.), the object of this invention can no longer be achieved, because the micelle formation becomes difficult, inclusion of fat or oil slackens, and the resulting composition becomes inferior in quality and stability of dispersion.

If viscosity of the aqueous solution is excessively high, as high as, for example, about 50,000 centipoises (at 25° C.) or higher, a uniform dispersion is hardly obtained because of increased cohesion of the aqueous solution itself. Therefore, it is desirable to assume the upper limit of the viscosity of aqueous solution as about 50,000 centipoises at 25° C.

In the present invention, if necessary, the aqueous solution can be admixed with, in addition to the animal extract, seasonings (for example, common salt, sugars, organic acids, amino acids, sodium nucleotide, spirits, soy sauce, vinegar, fruit juices, etc.), flavors, spices, colorants, nutrition fortifiers (for example, vitamines, minerals, amino acids, etc.), and preservatives. When incorporated with these additives, viscosity of the aqueous solution becomes generally 30 centipoises (at 25° C.) or higher.

If an aqueous solution containing the animal extract and admixed with, if necessary, seasonings and other additives has a viscosity below 30 centipoises (at 25° C.), it can be further mixed with water-soluble substances having thickening effect, such as corn syrup, dextrins (obtained from various starches having suitable dextrose equivalences) or gums (for example, locust bean gum, xanthan gum, gum tragacanth, gum arabic, etc.) to raise the final viscosity beyond 30 centipoises (at 25° C.). Even if the viscosity of an aqueous solution is higher than 30 centipoises (at 25° C), it is, of course, possible to add the above-noted dextrins or gums to raise the viscosity still higher.

Results of an experiment conducted to examine the relation between the viscosity of an aqueous solution and the solubilization of fat or oil are shown in Experiment Example 3.

EXPERIMENT EXAMPLE 3

Aqueous cane sugar solutions and aqueous dextrin solutions having various viscosities and containing 1% by weight in terms of WSN of the chicken hot-water extract, used as solubilizer, described in Table 1, were prepared as shown in Table 4 and used as the aqueous solution. To 1 part by weight of the aqueous solution, was added gradually 2 parts by weight of a salad oil with mild stirring in a manner described in Experiment Example 1.

The viscosity and state of dispersion of the resulting dispersions were as summarized in Table 4.

Table 4

| Composition of aqueous solution | Viscosity of aqueous solution, centipoise (25° C.) | Viscosity of dispersion, centipoise (25° C.) | State of dispersion Immediately after preparation | After one week |
|---|---|---|---|---|
| Distilled water | 5.5 | 108 | Dispersion of spherical oil droplets | Complete separation |
| 32.0% cane sugar solution | 14.4 | 488 | Dispersion of spherical oil droplets | Nearly complete separation |
| 38.5% cane sugar solution | 22.0 | 760 | Uniform viscous dispersion | Slight separation |
| 42.0% cane sugar solution | 30.0 | 1,250 | Uniform viscous dispersion | No separation; stable |
| 45.5% cane sugar solution | 39.2 | 1,470 | Uniform viscous dispersion | No separation; stable |
| 47.6% cane sugar solution | 50.0 | 2,630 | Uniform viscous dispersion | No separation; stable |
| 50.0% cane sugar | 63.8 | 3,192 | Uniform viscous | No separation; stable |

Table 4-continued

| Composition of aqueous solution | Viscosity of aqueous solution, centipoise (25° C.) | Viscosity of dispersion, centipoise (25° C.) | State of dispersion Immediately after preparation | After one week |
|---|---|---|---|---|
| solution | | | dispersion | |
| 55.6% cane sugar solution | 127.6 | 14,400 | Uniform viscous dispersion | No separation; stable |
| 50% Dextrin solution | 245.5 | 28,950 | Uniform viscous dispersion | No separation; stable |
| 62.5% Dextrin solution | 2,305 | >100,000 | Uniform gel-like dispersion | No separation; stable |
| Concentrate of hot-water extract of chicken * | 49,500 | >100,000 | Uniform gel-like dispersion | No separation; stable |

Note:
* WSN of concentrate of hot-water extract of chicken was 7.34% by weight.

The percentages given in Table 4 are by weight.

The fats and oils especially suitable for use in this invention are oils that are liquid at ordinary temperature, such as, for example, cottonseed soybean oil, corn oil, sesame oil, sunflower oil, peanut oil, rapeseed oil, coconut oil, palm oil, olive oil, copra oil, safflower oil, whale oil, fish oil, castor oil, paraffin oil, and various spice oils. When solid or semi-solid fats or oils such as, for example, lard, beef tallow, mutton tallow, and various hydrogenated oils are to be used, either or both of the solid or semi-solid fats or oils and the aqueous solution are heated so that on addition to the latter the fat or oil may disperse in molten state without solidification in the aqueous solution to form the intended fat- or oil-containing composition. In case the composition is intended for food use, the fat or oil should, of course, be edible.

The dispersion thus obtained by using a solid or semi-solid fat or oil is a clear viscous composition when kept at a temperature at which the solid or semi-solid fat or oil is in molten state, whereas when kept at a temperature at which the fat or oil solidifies, the dispersion becomes a translucent or opaque semi-solid or solid composition depending upon the solid or semi-solid fat or oil content and hydrogenation degree of the fat or oil.

Even when the dispersion obtained by using a solid or semi-solid fat or oil has solidified, the fat or oil still remains solubilized and the dispersion is stable without showing any separation.

The suitable proportion of fats and oils to be added to the aqueous solution is 6 parts or less, preferably 0.5 to 6 parts, particularly preferably 1 to 3 parts by weight to 1 part by weight of the aqueous solution. In other words, 6 parts by weight is the upper limit of fat and oil to be used in this invention. If the fat or oil is used beyond the upper limit, it tends to separate out.

In the case where the amount of fat or oil used is below 0.5 part by weight, although stability of the dispersion tends to decrease to some degree due to decreased thickening effect of the low fat or oil content, the fat or oil still remains in solubilized stable state without separating out for at least one month at room temperature and can meet the object of this invention.

When 0.5 to 6 parts of fat or oil are used, the dispersion formed is completely stable and the fat or oil content is large. Accordingly, if such a dispersion is intended for food use, there is obtained a highly nutritious food product with a high calorific value.

With the increase in oil content, the dispersion formed (or immediately after formed if a solid fat is used) becomes generally highly viscous and finally a gel. In order to obtain a dispersion having a consistency of jam, it is adequate to use 1 to 3 parts by weight of a fat or oil for 1 part by weight of the aforesaid aqueous solution.

It is also feasible, if necessary, to add to the fat or oil oil-soluble vitamins, colors, and antioxidants for the purpose of fortifying the nutritive value, coloring, and preserving.

The results of one of the experiments conducted to examine the relation between the amount of oil used and the solubilization are shown in Experiment Example 4.

EXPERIMENT EXAMPLE 4

An aqueous solution was prepared by dissolving 150 g of sugar in 75 g of water and adding a hot-water extract of fish, shown in Table 1, so that WSN of the aqueous solution may become 1% by weight. To the resulting aqueous solution (viscosity 412 centipoises at 25° C.), used as aqueous solution, was added gradually various amounts of cottonseed oil as shown in Table 5 with low-speed stirring in the same manner as in Experiment Example 1.

The state of dispersion and viscosity of the dispersions were as summarized in Table 5.

Table 5

| Weight ratio of oil to aqueous solution | Oil content of dispersion, % by weight | State of dispersion | Viscosity, 25° C., centipoise |
|---|---|---|---|
| 0.1 | 9.09 | Uniform; clear | 800 |
| 0.5 | 33.33 | Uniform; clear | 2,000 |
| 1.0 | 50.00 | Uniform; clear | 6,620 |
| 2.0 | 66.66 | Uniform; clear | 54,200 |
| 3.0 | 75.00 | Uniform; clear | >100,000 |
| 4.0 | 80.00 | Uniform; clear | >100,000 |
| 5.0 | 83.33 | Uniform; clear | >100,000 |
| 6.0 | 85.71 | Gel; clear | >100,000 |
| 6.5 | 86.66 | Gel; partial separation of oil | >100,000 |

Regarding the procedure of dispersing fats and oils in the aqueous solution, solubilization of fats and oils is difficultly effected by means of an ordinary emulsifying equipment, such as, for example, high-speed mixer, colloid mill, or homogenizer, which breaks down the dispersed phase to fine droplets. Suitable equipments for solubilizing are blenders, mixers, and kneaders provided with revolving agitator blades such as hook-type, screw-type and ribbon-type. It is preferable to add a predetermined amount of fat or oil gradually to the viscous aqueous solution while being agitated by revolving agitator blades at a low speed of, for example, 10 to 1,000 r.p.m. With such an operation, the fat or oil is gradually adsorbed by the micelles formed in the aqueous solution and disperses uniformly.

The fat- or oil-containing composition obtained according to this invention is a solubilized fat- or oil-containing composition comprising, in addition, the animal extract and, if necessary, other additives. The composition obtained by use of a liquid oil is clear and viscous, while that obtained by use of a solid or semi-solid fat or oil is translucent or opaque semi-solid or solid when the fat or oil has solidified. In case the composition is a food product, on entering the mouth, the fat or oil in the fat- or oil-containing food product is liberated in the form of very fine particles of about 1 $\mu$ from the food surface in contact with the saliva, similarly to an emulsified food, so that said food product is very light to taste, completely lacking that heaviness which originates from the fat or oil itself, mild and good to taste, and digestible.

The fat- or oil-containing food product, as an example of the fat- or oil-containing compositions obtained according to this invention, has a wide range of use by selection of the seasonings. For instance, by the addition of coffee flavor and vitamins, there is obtained a highly nutritious food product palatable as such; by incorporating a fruit juice, there is obtained fruit butter, a novel food product intermediate between butter and jam; and a new type of dressing is provided by incorporation of vinegar and spices.

Further, a fat- or oil-containing jelly food, one of the embodiments of the present composition, is obtained from an aqueous solution containing 0.8% by weight or more in terms of WSN of an aqueous extract of an animal raw material containing as main constituent water-soluble thermally noncoagulative peptides, by adding, if necessary, a seasoning and other additives to form an aqueous solution having a viscosity (at 25° C.) of 30 to 50,000 centipoises, further adding gelatin so that the aqueous solution may contain 2 to 10% by weight of gelatin, finally adding 4 parts by weight or less of a fat or oil to 1 part by weight (excluding gelatin) of the resulting aqueous solution while being stirred at a temperature at which the gelatin remains dissolved, and cooling. The fat- or oil-containing jelly food thus formed is a novel delicious one which contains protein and imparted with nutritive value of the fat or oil solubilized without addition of any artificial emulsifier or surface active agent, said jelly food retaining homogeneity without separating the solubilized fat or oil. As mentioned above, when a solid or semi-solid fat or oil is used as the fat or oil, the resulting product becomes unclear or semi-clear. On the contrary, when a liquid oil is used as the fat or oil, a clear product can be obtained. Among these products, a clear product obtained by using a liquid oil is particularly preferable as a jelly food for its appearance.

Examples of conventionally known jelly foods are jelly confection and dessert jelly, which are manufactured by adding congealants such as agar-agar, gelatin, and pectin to main ingredients including sugar, starch syrup, citric acid, food colors, and essences, heating the mixture to melt, cooling the melt to solidify, and, if necessary, shaping. Such products have long been widely fond of because of their transparent color, brightness, and special texture.

The conventional jelly products, however, are very poor foods from the standpoint of nutrition, except for sugars contained as sweetener; they have been accepted only as an enjoyment food, not at all as a nutritive source.

On the other hand, many attempts were made to obtain a fat- or oil-containing jelly confection with high nutritive value or a nutritious jelly, but none has been successful for the following reasons. Firstly, the addition of fat or oil accompanies inherent difficulties, because whatever congealant is selected, its binding ability in hindered by the presence of fat or oil and peptization occurs, preventing formation of jelly which contains fat or oil stably dispersed therein. Secondly, even if an attempt is made to incorporate fat or oil in the form of emulsion by use of an emulsifier or a surface active agent, the above-noted inherent difficulty in jelly formation still remains and, moreover, the resulting jelly loses transparency. For these reasons, it is unexpectable for prior art to manufacture a transparent jelly food containing fat or oil.

Therefore, the present inventors conducted extensive investigations to overcome the above-said difficulties and to develop a method for producing a novel fat- or oil-containing jelly food composition, especially, a novel transparent oil-containing jelly food which is full of nutrition, taste, and palate due to the fat or oil, and as a result have found that in the aforesaid method for manufacturing a food composition containing solubilized fat or oil, (1) when gelatin used as a congealant has been previously dissolved in the aqueous solution, the solubilization of fat or oil is not adversely affected by the presence of gelatin at a temperature at which gelatin remained as dissolved, and (2) when the dispersion comprising the aqueous solution, gelatin, and fat or oil is cooled to solidify, if the fat or oil content is excessively high, the fat or oil would separate out on account of cohesion of the solidified gelatin, whereas a fat- or oil-containing jelly food without separation of the fat or oil may be obtained if the weight ratio of the fat or oil to the aqueous solution (excluding gelatin) is 4 or less to 1.

In the present method for manufacturing a fat- or oil-containing jelly food, it is necessary that in the dispersion (without addition of gelatin) of fat or oil in the aqueous solution, which is to be congealed with gelatin used as a congealant, the fat or oil is solubilized in the aqueous solution.

As for the amount of fat or oil to be added to the aqueous solution containing gelatin, the fat or oil remains solubilized in the aqueous solution containing gelatin at a temperature at which gelatin does not solidify so long as the weight ratio of the fat or oil to the aqueous solution (excluding gelatin) is 6 or less to 1, whereas when gelatin solidifies, if the fat or oil content is excessively high, the fat or oil would be separated out due to the increased cohesion of gelatin. Therefore, in the present method for manufacturing a fat- or oil-containing jelly food, it is very important that the weight ratio of the fat or oil to the aqueous solution (excluding gelatin) is 4 or less to 1, preferably about 1 to 1.

The fat or oil for use in the present method for manufacturing a fat- or oil-containing jelly food can be any of edible fats or oils such as those fats or oils listed above, especially, those which are liquid at room temperature.

The results of one of the experiments conducted to examine the relation between the viscosity of the aqueous solution (viscosity before addition of gelatin) and the solubilization of fat or oil in the present method for manufacturing a fat- or oil-containing jelly food are shown in Experiment Example 5.

EXPERIMENT EXAMPLE 5

An aqueous solution was prepared by adding the hot-water extract of beef, used as solubilizing agent, shown in Table 1, to the aqueous cane sugar solutions or aqueous dextrin solutions having varied viscosities, as shown in Table 6, so that WSN of the resulting aqueous solutions may become 1% by weight. Gelatin was added to the aqueous solutions thus formed so that each aqueous solution may contain 8% by weight of gelatin. To 1 part by weight (excluding gelatin) of the resulting solution at a temperature at which the gelatin does not solidify, was added gradually 2 parts by weight of salad oil with stirring at low speed in the same manner as in Experiment Example 1. The resulting mixture was allowed to solidify by cooling at 5° C. The properties of the congealed mass were as summarized in Table 6.

Table 6

| Composition of aqueous soln. | Viscosity of aqueous soln., centipoise (25° C.) | Stiffness of jelly, g. | State of congealed mass |
|---|---|---|---|
| 35% Aqueous cane sugar soln. | 17.6 | 18 | Turbid; peptized |
| 40% Aqueous cane sugar soln. | 30.0 | 90 | Clear; stable |
| 45% Aqueous cane sugar soln. | 47.6 | 113 | Clear; stable |
| 50% Aqueous cane sugar soln. | 99.5 | 136 | Clear; stable |
| 55% Aqueous cane sugar soln. | 227.5 | 223 | Clear; stable |
| 50% Aqueous dextrin solution | 1100.0 | 238 | Clear; stable |

Stiffness of the jelly was measured in the following way: The sample prior to congealment was introduced in a Petri dish to a depth of 1 cm and allowed to congeal by cooling at 5° C. for one hour to obtain a test specimen. Using Rheometer (Fuji Rika Kogyo Co.), an adapter disk, 1.227 cm² in area, was pressed against the test specimen at a rate of 0.1 cm/second and the maximum stress (g) at the penetration of 5 mm was measured.

Results of one of the experiments conducted to examine the relation between the amount of oil solubilized in the aqueous solution containing gelatin and the properties of jelly are shown in Experiment Example 6.

EXPERIMENT EXAMPLE 6

The aqueous solution used was an aqueous solution (viscosity, 248 centipoises at 25° C.) containing 13.6% (1% by weight in terms of WSN) of the hot-water extract of chicken (WSN, 7.34%), shown in Table 1, and 55% of sugar. Dry gelatin was added to the said aqueous solution so that the resulting solution may contain 8% by weight of gelatin. To the resulting solution while being kept at 60° C. by heating (gelatin remained as dissolved), was added gradually soybean oil in proportions as shown in Table 7 with low-speed stirring in the same way as in Experiment Example 1. The dispersion obtained was cooled to 0° C. to congeal.

The state of the congealed mass and jelly strength (cutting stress) were as shown in Table 7.

Table 7

| Weight ratio of oil to aqueous solution * | Oil/(aqueous solution + oil), % by weight | State of congealed mass | Jelly strength ** (cutting stress), g |
|---|---|---|---|
| 0.1 | 9.09 | Clear; stable; no separation of oil | 367 |
| 0.5 | 33.33 | " | 215 |
| 1.0 | 50.00 | " | 123 |
| 2.0 | 66.66 | " | 74 |
| 3.0 | 75.00 | " | 21 |

Table 7-continued

| Weight ratio of oil to aqueous solution * | Oil/(aqueous solution + oil), % by weight | State of congealed mass | Jelly strength ** (cutting stress), g |
|---|---|---|---|
| 4.0 | 80.00 | " | 10 |
| 5.0 | 83.33 | Separation of oil | — |

Note:
* Weight of the aqueous solution does not include weight of gelatin.
** Jelly strength: By use of a piano wire, the maximum cutting stress (g) was measured on a molded test specimen, 10 mm wide, 5 mm thick. (For reference, the jelly strength of a commercial jelly confection in cube form was 100 to 200 g.).

As mentioned above, an intended fat- or oil-containing jelly food may be obtained by adding gelatin to the aqueous solution having a viscosity of 30 centipoises or higher at 25° C and containing 0.8% by weight or more in terms of WSN of an animal extract, and then adding 4 parts by weight or less of a fat or oil to 1 part by weight (excluding gelatin) of said gelatin-containing aqueous solution. The addition of gelatin can be carried out at any stage during or after preparation of the aqueous solution but before addition of the fat or oil.

As for the amount of gelatin to be added to the aqueous solution, it is important that the concentration of gelatin in said aqueous solution becomes 2 to 10%, preferably 3 to 8%, by weight, depending upon the expected jelly strength of the intended fat- or oil-containing jelly food. If the concentration of gelatin is below 2%, the shape retention becomes inferior, while if it exceeds 10%, the jelly becomes too gummy to be palatable.

Although the addition of gelatin to the aqueous solution can be carried out in various ways, uniform dissolution of gelatin in the aqueous solution may be effected most conveniently by prior dissolution of gelatin in a portion of water for use in preparing the aqueous solution to form a warm aqueous solution containing gelatin in a high concentration of about 30 to 50%.

The addition of a fat or oil to the aqueous solution containing gelatin should be carried out at a temperature at which gelatin remains as dissolved, for example at a temperature of 50° C. or higher.

Dispersion of a fat or oil in the aqueous solution containing gelatin can be effected in the same way as mentioned above, and the fat or oil becomes stably solubilized by being adsorbed on the micelles formed in the aqueous solution.

On being cooled in a suitable container at a temperature below room temperature, for example at 0° to 5° C., the uniform dispersion thus formed is congealed by gelatin to produce the intended uniform jelly food in which the fat or oil is solubilized.

The jelly food product thus obtained has a consistency ranging from that of a pudding to that of a jelly confection, depending upon the viscosity of the aqueous solution, gelatin content, and fat or oil content. For example, the product with pudding-like consistency can be packed in a suitable container (i.e. a cup) for commercialization; the product with consistency like a jelly confection can be commercialized, for example, after having been cut to a suitable size and sprinkled with a powder such as powdered sugar to prevent blocking.

The jelly food obtained according to this invention is a uniform food in which the fat or oil is solubilized and does not separate out. On entering the mouth and contacting with saliva, the present jelly food together with the saliva becomes a turbid and creamy material in which fine droplets of fat or oil are dispersed. Consequently, the jelly food is excellent in digestibility even if it contains a large amount of fat or oil and is light in taste without having that heaviness which is due to the fat or oil itself nor giving a sense of satiety; its taste is quite light, mild, delicious, and creamy.

Although the fat- or oil-containing jelly food obtained according to this invention can be used in wide field depending upon selection of seasonings and other additives, it is particularly useful as a dessert jelly and jelly confection.

In manufacturing, for example, a jelly confection, a transparent oil-containing product excellent in nutritive value and in texture can be obtained by adding to the aqueous solution about 55% of cane sugar, properly selected flavor and other additives for use in ordinary confectioneries, about 8% of gelatin, and 1 part by weight of a liquid oil for 1 part by weight of the aqueous solution.

Further, since the fat- or oil-containing jelly food produced according to this invention can be incorporated with fats and oils, proteins, carbohydrates, all of the trace nutrients whether water-soluble or oil-soluble, in addition to conventional ingredients of jelly, it is possible to provide a high-nutrition jelly food.

As disclosed in the foregoing, the composition of this invention contains none of the artificial emulsifiers nor of the surface active agents. Accordingly, when, for example, a food product is produced according to this invention, the product obtained in an unprecedented food product containing solubilized fat or oil and is freed from those food additives which are suspected of the source of harmful foods. Thus, the present invention is novel and of great significance.

The invention is illustrated below with reference to Examples, but the invention is not limited to these Examples.

EXAMPLE 1

An aqueous solution (WSN, 1.02% by weight; viscosity, 57 centipoises at 25° C.) was prepared by dissolving 3 kg of sugar and 1 kg of the hot-water extract (WSN, 7.19% by weight) of pork, shown in Table 1, in 3 liters of water. A mixture of 5 kg of parched and ground peanuts and 20 kg of soybean oil was gradually added to the aqueous solution (2.9 parts by weight of soybean oil for 1 part by weight of the aqueous solution) while being stirred at 500 r.p.m. by means of Dalton universal agitator (Sanei Seisakusho Co.) provided with hook-type agitator blades, to obtain 32 kg of an oil-containing food resembling peanut butter (viscosity, 31,000 centipoises at 25° C.), which was clear and excellent in gloss.

This oil-containing food product resembling peanut butter was stable and the oil did not separate out even after the product had been left standing for 2 months at room temperature.

This oil-containing food product, which contained more than 60% by weight of soybean oil, was a flavored high-calorie oil-containing food which was very delicious, excellent in palatability, and suitable for serving with bread and also for pie filling.

EXAMPLE 2

To a mixture of 25 kg of vinegar and 2 kg of glacial acetic acid, were added 10 kg of dextrin, 10 kg of sugar, 1 kg of salt, 0.3 kg of sodium glutamate; each 0.2 kg of onion extract, ginger extract, and white pepper; and 10 kg of the hot-water extract of chicken (WSN, 7.34% by weight) shown in Table 1. The mixture were thoroughly mixed until dissolved to obtain 58.9 kg of an aqueous solution which had a viscosity of 102 centipoises at 25° C., as measured in the same manner as in Example 1, and the WSN of which was 1.25% by weight, said WSN having been associated with the hot-water extract of chicken. To the aqueous solution while being stirred at 200 r.p.m. by means of Dalton universal agitator, was added gradually 100 kg of salad oil containing 0.2 kg of dissolved oleoresin paprika (1.69 parts by weight of salad oil for 1 part by weight of the aqueous solution), to obtain 159.1 kg of a uniform and viscous oil-containing food product having an appearance of dressing.

The product had a viscosity of 49,000 centipoises at 25° C. and was a stable oil dispersion which showed no separation of oil after having been left standing for 2 months at room temperature.

EXAMPLE 3

A mixture of 10 kg of apple juice concentrate (concentrated to one-fifth the original volume), 5 kg of sugar, 2.4 kg of the beef hot-water extract (WSN, 6.96% by weight) shown in Table 1, and 31 g of calcium sorbate was made to dissolve by heating at about 80° C. to obtain 17.43 kg of an aqueous solution having a viscosity of 364 centipoises at 25° C. and a WSN of 0.96% by weight, said WSN having originated from the beef hot-water extract. To the aqueous solution while being stirred at low speed in the same manner as in Example 1, was added gradually 26.15 kg of salad oil (1.5 parts by weight of salad oil for 1 part by weight of the aqueous solution) to obtain 43.5 kg of a uniform, clear, and viscous product having a viscosity of 47,000 centipoises at 25° C.

The product was a delicious oil-containing food resembling fruit butter and was stable, neither showing oil separation nor getting moldy after having been left standing for 2 months at room temperature.

EXAMPLE 4

A mixture was prepared from 20 kg of concentrated "Unshu" mandarin orange juice (concentrated to one-fifth the original volume), 45 kg of granulated sugar, 14.4 kg of the beef hot-water extract (WSN, 6.96%) shown in Table 1, 4.6 kg of water, and a gelatin solution containing 8 kg of dried gelatin dissolved in 8 kg of warm water, to form 100 kg of a gelatin-containing aqueous solution (WSN, 1.089%; viscosity, 263 centipoises at 25° C.; gelatin content, 8%; WSN and the viscosity were measured on the 92 kg of aqueous solution containing no gelatin). To the gelatin containing aqueous solution while being heated at 80° C. and stirred at 500 r.p.m. by means of Dalton universal agitator (Sanei Seisakusho Co.) provided with hook-type agitator blades, was added gradually 100 kg of salad oil (1.1 parts by weight of salad oil for 1 part by weight of the aqueous solution) to obtain a clear, uniform, and viscous composition. The composition was poured in a stainless steel pan, left standing in a refrigerator at 0° C. for 2 hours to allow the composition to congeal, then shaped by cutting, and sprinkled with powdered sugar to obtain 200 kg of clear jelly containing oil and having an orange flavor. This product contained 50% of oil, about 18% of calculated protein, and about 20% of carbohydrate, was clear, delicious, highly nutritious, and stable without separating the oil.

EXAMPLE 5

A mixture was prepared from 20 kg of a coffee syrup having a refractive index of 37.4, 47.5 kg of granulated sugar, 13.0 kg of the pork hot-water extract (WSN, 7.19%) shown in Table 1, 16 kg of warm 50% aqueous gelatin solution, and 3.5 kg of water, to form 100 kg of a gelatin-containing aqueous solution (WSN, 1.016%; viscosity, 212 centipoises at 25° C.; gelatin content, 8%; WSN and the viscosity were measured on the 92 kg of aqueous solution containing no gelatin). To the gelatin-containing aqueous solution while being heated at 70° C. and stirred at low speed in the same manner as in Example 4, was added gradually 200 kg of cottonseed oil (2.1 parts by weight of cottonseed oil for 1 part by weight of the aqueous solution) to obtain a clear, uniform, and viscous composition. The composition was poured in a stainless steel pan, left standing in a refrigerator at 0° C. for 2 hours to allow the composition to congeal completely, then shaped into cubes. The product thus obtained was a clear oil-containing jelly food which contained 66% of oil, 4.6% of calculated protein, and 18.3% of carbohydrate, and was delicious and stable.

EXAMPLE 6

A mixture was prepared from 20 kg of commercial concentrated grape juice (refractive index 55), 45 kg of granulated cane sugar, 13.6 kg of the chicken hot-water extract (WSN, 7.34%), 6 kg of a warm 50% (by weight) aqueous gelatin solution prepared from dried gelatin, and 15.4 kg of water, to form 100 kg of a gelatin-containing aqueous solution (WSN, 1.031%; viscosity, 213 centipoises at 25° C.; gelatin content, 3%; WSN and the viscosity were measured on the 97 kg of aqueous solution containing no gelatin). To the gelatin-containing aqueous solution while being heated at 80° C. and stirred at low speed in the same manner as in Example 4, was added gradually 50 kg of salad oil (0.5 part by weight of salad oil for 1 part by weight of the aqueous solution) to obtain a clear, uniform, and viscous composition. The composition was poured in a jelly mold and allowed to congeal with cooling at 0° C. to obtain a clear and uniform oil-containing jelly food which was delicious and soft suitable for dessert.

EXAMPLE 7

Ground mutton, which had been removed of lipids by extraction, was covered with five times its weight of water, subjected to hot-water extraction at 95° C. for 5 hours, then centrifuged to remove insoluble matters, and concentrated to obtain concentrated mutton hot-water extract (WSN, 3.6%). The extract was turbid and had disagreeable odor. For the purpose of purification, 100 kg of the concentrated extract was admixed with 200 liters of 99.5% ethyl alcohol and 12 kg of activated carbon, stirred thoroughly, filtered by use of diatomaceous earth, and re-concentrated to obtain 82.5 kg of purified concentrate of mutton hot-water extract (WSN, 3.82%). A mixture of 3.95 kg of the purified concentrate, 9.0 kg of granulated cane sugar, and 2.05 kg of water was heated to form a solution. To the solution, were added 0.3 kg of maple flavor and 0.15 kg of caramel color to obtain 15.45 kg of an aqueous solution (WSN, 0.976%; viscosity, 495 centipoises at 25° C.). The aqueous solution was placed in a vacuum agitation mixer and gradually admixed with 30 kg of rapeseed oil with stirring (300 r.p.m.) to obtain about 45 kg of a clear and viscous composition.

The composition thus obtained was a clear, viscous, and highly nutritious food product (viscosity, >100,000 centipoises at 25° C.) containing about 66.0% of oil and having maple syrup flavor. It was considered a new kind of margarine and was suitable for serving with hot cake and for topping.

EXAMPLE 8

A mixture of 20 kg of concentrated orange juice (concentrated to one-fifth the original volume), 45 kg of granulated cane sugar, 14.4 kg of concentrated beef hot-water extract (WSN, 6.96%), and 20.6 kg of water was heated to form 100 kg of an aqueous solution (WSN, 1.00%; viscosity, 225 centipoises at 25° C.). To the aqueous solution, placed in an agitated vessel, while being heated at 60° C. and agitated in the same manner as in Example 7, were added 300 kg of hydrogenated coconut oil (melting point, 38° C.), a small amount of orange essential oil, and food color to obtain a clear and viscous composition. The composition was poured in a mold and allowed to set by keeping at 0° C. to obtain 400 kg of opaque, solid, and delicious fruits margarine with rich orange flavor. At room temperature, this product retained its shape and was stable without separation of the oil.

When the weight of hydrogenated coconut oil was equal to or twice the weight of aqueous solution, there was obtained a soft-type fruit margarine which was easily spreadable on a bread.

What is claimed is:

1. A fat- or oil-containing composition comprising 0.5 to 6.0 parts by weight of a fat or oil and 1 part by weight of an aqueous solution containing 0.8 to 10% by weight in terms of water-soluble nitrogen of an aqueous extract of an animal meat, which extract contains as its main constituent water-soluble and thermally noncoagulable peptides, said aqueous solution having a viscosity of 30 to 50,000 centipoises at 25° C., and said fat or oil being solubilized in said aqueous solution.

2. The composition of claim 1 wherein said aqueous extract is obtained by extracting animal meat with water and removing thermally coagulable materials therefrom.

3. A fat- or oil-containing composition according to claim 1, wherein the fat or oil is an edible one.

4. A fat- or oil-containing composition according to claim 3 which contains at least one member selected from the group consisting of seasonings, flavors, spices, colorants, nutrition fortifying agents, and preservatives.

5. A fat- or oil-containing composition according to claim 3 which contains gelatin.

6. A fat- or oil-containing composition according to claim 5, wherein gelatin content of the aqueous solution is 2 to 10% by weight and 4 parts by weight or less of the fat or oil is solubilized in 1 part by weight of the aqueous solution provided that the weight of gelatin is excluded.

7. A fat- or oil-containing composition according to claim 6, wherein the fat or oil is a liquid oil.

8. A fat- or oil-containing composition according to claim 3 which contains at least one member selected from the group consisting of sugars, corn syrup and organic acids.

9. A method for manufacturing a fat- or oil-containing composition, said composition comprising a fat or oil solubilized in an aqueous solution, said method comprising adding with stirring 0.5 to 6.0 parts by weight of a fat or oil to 1 part by weight of an aqueous solution containing 0.8% to 10% by weight in terms of water-soluble nitrogen of an aqueous extract of an animal meat which extract contains as its main constituent water-soluble and thermally noncoagulable peptides, said aqueous solution having a viscosity of 30 to 50,000 centipoises at 25° C., thus solubilizing said fat or oil in said aqueous solution.

10. A method according to claim 9, wherein the fat or oil is an edible one.

11. A method according to claim 9, wherein 6 parts by weight or less of the fat or oil are added to 1 part by weight of the aqueous solution.

12. A method according to claim 9, wherein dextrin, corn syrup or a gum is added to the aqueous solution to increase the viscosity of the aqueous solution to 30 centipoises at 25° C. or higher.

13. A method according to claim 9, wherein the stirring is effected by means of a blender, mixer, or kneader.

14. A method for manufacturing a fat- or oil-containing composition, said composition comprising a fat or oil solubilized in an aqueous solution, said composition comprising adding gelatin to an aqueous solution containing 0.8% to 10% by weight in terms of water-soluble nitrogen of an aqueous extract of an animal meat, which extract contains as its main constituent water-soluble and thermally noncoagulable peptides, said aqueous solution having a viscosity of 30 to 50,000 centipoises at 25° C., adding an edible fat or oil to the resulting gelatin-containing aqueous solution while stirring said solution at a temperature at which gelatin dissolves in said solution, thus causing solubilization of said fat or oil and forming a uniform, and viscous composition, the proportion of said fat or oil being 4 parts by weight or less of the fat or oil to 1 part by weight of the aqueous solution, provided that the weight of gelatin is excluded, and then cooling the resulting solubilized composition to congeal.

15. A method according to claim 14, wherein the edible fat or oil is a liquid oil.

16. A method according to claim 14, wherein the gelatin content of the aqueous solution is 2 to 10% by weight.

17. A method according to claim 14, wherein the stirring is conducted in a blender, mixer, or kneader.

* * * * *